UNITED STATES PATENT OFFICE.

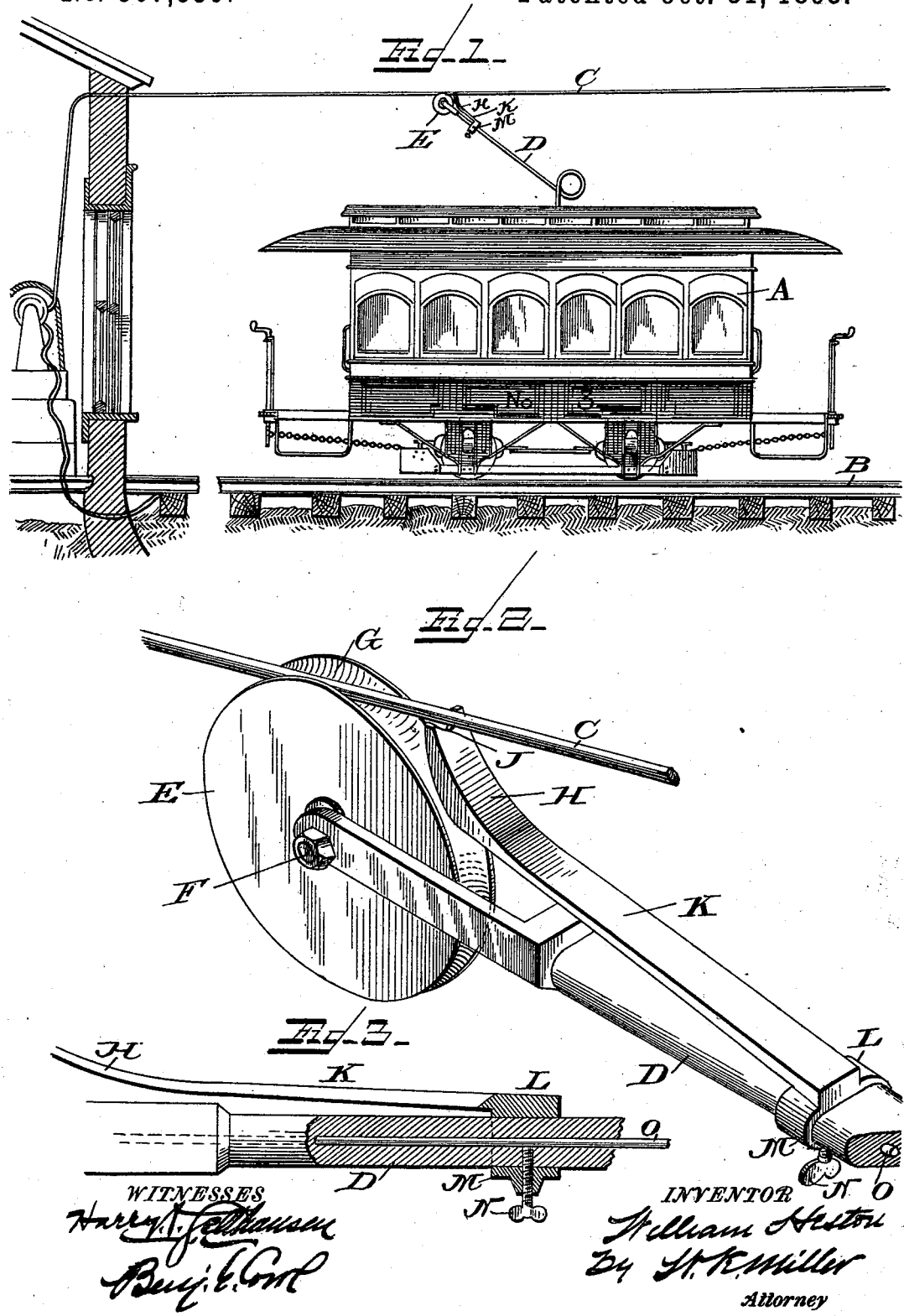

WILLIAM HESTON, OF ALLIANCE, OHIO.

ICE-SCRAPER FOR TROLLEY-WIRES.

SPECIFICATION forming part of Letters Patent No. 507,539, dated October 31, 1893.

Application filed November 26, 1892. Serial No. 453,242. (No model.)

*To all whom it may concern:*

Be it known that I, WILLIAM HESTON, a citizen of the United States, and a resident of Alliance, county of Stark, State of Ohio, have invented a new and useful Improvement in Trolleys for Railway-Cars, of which the following is a full, clear, and exact description, reference being had to the accompanying drawings, making part of this specification.

My invention relates to improvements in trolleys for electric railway cars, the object of which is to provide means for removing ice and other obstructions or accumulation as may form or gather on or about the overhead conductor, and thereby prevent or obstruct the flow of the electric current from the conductor to the trolley or motor.

To this end my invention consists in certain features of construction and combination of parts as hereinafter described and pointed out in the claims.

Figure 1, in the accompanying drawings is a side elevation illustrating my invention. Fig. 2, is an enlarged view of a trolley and wire scraper, and a fragment of conductor, and Fig. 3, a sectional view of a portion of the trolley pole and scraper.

It has been found that in operating street and other railway cars by a current of electricity conducted by an overhead wire from the place where generated to, and along the way upon which said cars are propelled by a current of electricity passed from said overhead wire through a trolley having a rolling engagement with said wire to an electric motor located on the car, the formation of ice on and about the wire during frosty, as well as wet freezing weather has been such as to in many instances arrest the operation of the motor and delay if not wholly arrest the movement of the car, and to obviate to some extent the trouble arising as hereinbefore stated, it has been necessary to provide a man with a pole having an insulated scraping device on the end thereof, the man to stand upon the car and with the pole so provided either scrape or pole the ice from the wire in advance of the trolley. To obviate this laborious, as well as dangerous task, and to secure a more perfect and certain operation of street and other cars, operated by an overhead conductor as well as to prevent accident, the loss of life, destruction of property, and to reduce the cost of operating such cars, I have provided an automatic scraper to remove from the wire the hereinbefore mentioned obstruction.

As my invention is applicable to many of the systems, and trolleys now in use, for connecting motors on cars, with an over-head conductor, I will proceed to describe my invention, referring only to the car and motor in conjunction therewith.

A, represents an ordinary street car, mounted on wheels adapted to follow a train-way or track B, over which track is provided an electric conducting wire C. To the deck or other portion of said car is secured a trolley pole D, having at its upper end a wheel E secured thereto, by an axle bolt F, and having a peripheral groove G, to guide said wheel on the wire C. At the upper end portion of the pole D, see Fig. 2, is provided a scraper H, having at its upper portion a groove J, adapting it to follow and scrape the lower and side portions of the wire, to remove ice or other accumulation from the wire, that may interrupt or interfere with the flow of the electric fluid from the overhead conductor, to the trolley and electric motor by which the car is driven.

For the purpose of this case I have provided the scraper with a yielding support or spring portion K, one end of which is adapted for engagement with the trolley pole D, the other or free end, to support the scraper N, and have shown the one end L, of the support K, provided with a loop M to embrace the pole D and a set screw N by which the scraper and support may be secured to the pole and a connection formed by the screw N with the conducting wire O, by which the electric fluid may pass to the motor, *via* the scraper as well as *via* the trolley wheel, and when not in use the screw N may be turned back and the scraper moved down the pole a distance and secured to the pole, or may be removed therefrom and replaced as occasion for its use may require.

The object of the yielding support or spring portion K is to provide a means by which the scraper may yield when brought in contact with laps and joints, in the conductor wire C or portions of devices by which said wire is supported in its overhead position, and thereby automatically maintain either by the wheel E or scraper H or both, a constant connection or engagement with the wire C and a continuous flow of the electric fluid to the motor.

I would not limit myself to the form of scraper shown nor to the method shown of supporting and securing it to the trolley pole, as other methods or ways may be provided by which a similar result may be attained; but What I do claim as new, and desire to secure by Letters Patent, is—

1. The combination with a railway car, having an electric motor mounted thereon, actuated by a current of electricity from an overhead conducting wire, of a trolley pole, supported on and secured to said car, a trolley supported by said pole in engagement with said overhead conducting wire, a wire to connect said trolley wire with the motor, and a scraper to remove ice or other accumulation from the overhead wire, substantially as described and for the purpose set forth.

2. In combination with an overhead conductor, a trolley pole, and trolley, of a scraper having a yielding support, substantially as described and for the purpose set forth.

3. The combination of a trolley pole and trolley, of a scraper adjustably secured to said pole, substantially as described and for the purpose set forth.

4. In combination an overhead conductor, a trolley pole supporting a trolley in engagement with said conductor, a wire connecting said trolley with a motor, and a scraper, the free end adapted to scrape said conductor, the other end thereof connected with said wire, whereby the electric fluid may flow through said trolley and scraper, simultaneously or separately, substantially as described and for the purpose set forth.

5. The combination with a trolley pole and trolley of a scraper, having at one of its end portions a loop M to embrace the pole, a set screw N to secure the loop and scraper in desired adjustment, a spring portion K supporting on its free end a scraper H, having a grooved end portion J, substantially as described and for the purpose set forth.

In testimony whereof I have hereunto set my hand this 30th day of October, A. D. 1892.

WILLIAM HESTON.

Witnesses:
W. K. MILLER,
CHAS. R. MILLER.